(12) United States Patent
Risse et al.

(10) Patent No.: US 9,969,370 B2
(45) Date of Patent: May 15, 2018

(54) METHOD AND CONTROL DEVICE FOR WARNING A VEHICLE DRIVER OF A RISK OF THE VEHICLE OVERTURNING

(75) Inventors: Rainer Risse, Pattensen-Reden (DE); Axel Stender, Hameln (DE)

(73) Assignee: WABCO GmbH, Hannover (DE)

( * ) Notice: Subject to any disclaimer, the term of this patent is extended or adjusted under 35 U.S.C. 154(b) by 120 days.

(21) Appl. No.: 14/240,937

(22) PCT Filed: Jun. 13, 2012

(86) PCT No.: PCT/EP2012/002494
§ 371 (c)(1),
(2), (4) Date: Feb. 25, 2014

(87) PCT Pub. No.: WO2013/029703
PCT Pub. Date: Mar. 7, 2013

(65) Prior Publication Data
US 2014/0214299 A1    Jul. 31, 2014

(30) Foreign Application Priority Data
Aug. 31, 2011   (DE) .......................... 10 2011 111 862

(51) Int. Cl.
*B60T 8/1755*   (2006.01)
*B60T 7/12*     (2006.01)
(Continued)

(52) U.S. Cl.
CPC ............ *B60T 8/17554* (2013.01); *B60T 7/12* (2013.01); *B60T 8/243* (2013.01); *B60T 13/385* (2013.01);
(Continued)

(58) Field of Classification Search
None
See application file for complete search history.

(56) References Cited

U.S. PATENT DOCUMENTS 5,825,284 A * 10/1998 Dunwoody ........ B60G 17/0162
                                           340/438
6,176,555 B1 *  1/2001 Semsey ............... B60T 8/17554
                                           280/282
(Continued)

FOREIGN PATENT DOCUMENTS

DE    196 02 879 C1   8/1997
DE    197 51 925 A1   5/1999
(Continued)

OTHER PUBLICATIONS

Stability Dynamics; LG Alert Lateral Acceleration Indicator User/Installation Manual; Nov. 2006; Document No. 800001 Ver. 4; http://www.stabilitydynamics.com/usermanuals/800001-04%20LG-Alert%20User%20Manual%20(Lateral%20Acceleration%20Indicator).pdf.*

*Primary Examiner* — John Olszewski
*Assistant Examiner* — David P. Merlino
(74) *Attorney, Agent, or Firm* — Warner Norcross & Judd LLP (57) ABSTRACT

In a method for warning a vehicle driver of a risk of the vehicle overturning about its longitudinal axis, a control device detects the current transverse acceleration of the vehicle and emits a warning signal based thereon when a risk of overturning is presented. The warning signal is dependent upon at least one transverse acceleration value, which is critical for overturning, detected by the control device while the vehicle is being driven, and a measurement of the transverse acceleration of the vehicle at which the vehicle would actually overturn about its longitudinal axis. The transverse acceleration value that is critical for overturning is determined automatically based on the vehicle behavior exhibited during driving on a curve.

7 Claims, 6 Drawing Sheets

(51) Int. Cl.
    *B60T 8/24*           (2006.01)
    *B60T 13/38*         (2006.01)
    *B60T 13/66*         (2006.01)
    *B60T 13/68*         (2006.01)
    *B60T 17/22*         (2006.01)

(52) U.S. Cl.
    CPC .......... *B60T 13/662* (2013.01); *B60T 13/683* (2013.01); *B60T 17/221* (2013.01)

(56) References Cited

U.S. PATENT DOCUMENTS

| | | | |
|---|---|---|---|
| 6,272,420 B1* | 8/2001 | Schramm | B60T 8/172 |
| | | | 701/72 |
| 6,384,719 B1* | 5/2002 | Dieckmann | B60T 8/17554 |
| | | | 701/72 |
| 6,456,194 B1* | 9/2002 | Carlson | B60G 17/0165 |
| | | | 340/440 |
| 6,494,281 B1* | 12/2002 | Faye | B60T 8/17554 |
| | | | 701/1 |
| 6,498,976 B1 | 12/2002 | Ehlbeck et al. | |
| 6,553,284 B2* | 4/2003 | Holst | B60T 8/17554 |
| | | | 701/1 |
| 6,554,293 B1 | 4/2003 | Fennel et al. | |
| 6,654,671 B2* | 11/2003 | Schubert | B60R 21/0132 |
| | | | 701/46 |
| 7,040,722 B2* | 5/2006 | Szabo | B60T 8/17554 |
| | | | 701/1 |
| 7,573,375 B2* | 8/2009 | Penzotti | B60T 8/17554 |
| | | | 340/436 |
| 9,128,113 B2* | 9/2015 | Henderson | B60K 35/00 |
| 9,162,656 B2* | 10/2015 | Mattson | B60T 8/17554 |
| 2002/0056582 A1* | 5/2002 | Chubb | B60T 8/17551 |
| | | | 180/197 |
| 2004/0102894 A1* | 5/2004 | Holler | B60T 8/17554 |
| | | | 701/124 |
| 2004/0183372 A1* | 9/2004 | Heuer | B60T 8/17554 |
| | | | 303/123 |
| 2004/0217647 A1* | 11/2004 | Einig | B60T 8/17554 |
| | | | 303/146 |
| 2006/0080004 A1* | 4/2006 | Cheok | G01C 15/14 |
| | | | 701/1 |
| 2007/0027596 A1* | 2/2007 | Stavroff | B60W 30/04 |
| | | | 701/38 |
| 2007/0078581 A1* | 4/2007 | Nenninger | B60T 8/17554 |
| | | | 701/70 |
| 2007/0138865 A1* | 6/2007 | Amato | B60T 8/17554 |
| | | | 303/191 |
| 2008/0272899 A1 | 11/2008 | Penzotti | |
| 2008/0312813 A1* | 12/2008 | Sverrisson | B60T 8/172 |
| | | | 701/124 |
| 2010/0070149 A1* | 3/2010 | Fry | B60T 8/17554 |
| | | | 701/70 |

FOREIGN PATENT DOCUMENTS

| | | |
|---|---|---|
| DE | 198 02 041 A1 | 7/1999 |
| DE | 199 07 633 | 10/1999 |
| DE | 199 58 221 A1 | 6/2001 |
| DE | 100 17 045 A1 | 10/2001 |
| DE | 10 2004 006 696 A1 | 6/2005 |
| DE | 10 2004 040 140 | 2/2006 |
| DE | 10 2008 041 586 A1 | 3/2010 |
| EP | 0 798 615 A1 | 10/1997 |
| EP | 0 919 445 A1 | 6/1999 |
| EP | 1 104 732 A2 | 6/2001 |
| EP | 1 270 335 A1 | 1/2003 |
| WO | WO 98/25779 | 6/1998 |
| WO | WO 02/22416 A1 | 3/2002 |
| WO | WO 02/074593 A1 | 9/2002 |

* cited by examiner

METHOD AND CONTROL DEVICE FOR WARNING A VEHICLE DRIVER OF A RISK OF THE VEHICLE OVERTURNING

FIELD OF THE INVENTION

The present invention generally relates to a method and control device for warning the driver of a vehicle (especially, a commercial vehicle, e.g., a towing vehicle and, perhaps, trailer vehicles) of a risk of the vehicle overturning about its longitudinal axis.

BACKGROUND OF THE INVENTION

U.S. Pat. No. 6,498,976 B1 describes a method for warning a driver of a risk of the vehicle overturning when travelling around a turn, so that, if required, the driver can adjust the speed of the vehicle, e.g., by braking, such that a safe driving state is retained. The warning signal is generated if the current lateral acceleration of the vehicle exceeds a fixed threshold value. However, the determination of the threshold value is, in practice, associated with a cost, especially, when it comes to many different types of vehicle.

U.S. Pat. No. 6,498,976 B1 proposes making the threshold value variable inasmuch that it is made dependent on the mass of the vehicle. If the vehicle mass is known, a suitable threshold value can be obtained from a table. However, apart from the determination of the data for the table being costly, the mass of the vehicle offers only limited accuracy regarding the actual lateral acceleration at which the vehicle would overturn about its longitudinal axis. Indeed, the mass of the vehicle offers no indication regarding the height at which a load is disposed or how the load is distributed on the load bearing area of the vehicle.

SUMMARY OF THE INVENTION

Generally speaking, it is an object of the present invention to provide an improved, more accurate way to warn the driver of a vehicle of a risk of the vehicle overturning about its longitudinal axis, whereby the cost of determining the threshold value or the table values is avoided or at least significantly reduced.

According to an embodiment of the present invention, a control device detects the current lateral acceleration of the vehicle and, depending thereon, outputs a warning signal in the event of a risk of overturning. The control device makes the warning signal additionally dependent on at least one rollover-critical lateral acceleration value determined by the control device while the vehicle is travelling. This value can be a measure of the lateral acceleration of the vehicle at which the vehicle would actually overturn about its longitudinal axis, and can be automatically determined by the control device based on the vehicle's behavior while traversing a turn.

The inventive warning method offers the advantage that a specific threshold value or table entry depending on the vehicle's type and its loading does not have to be entered and experimentally determined in advance. Compared to a method using a fixed threshold value, the inventive method enables a realistic warning to the driver adapted to actual conditions; it avoids the warning being generated unnecessarily early, i.e., for a relatively low lateral acceleration. The inventive method can therefore be used for very different types of vehicles, such as, e.g., towing machines, trailers, and drawbar trailers, and with different bodies, such as, e.g., with container transports, closed box structures and dump trucks. In relation to the risk of overturning, the track width of the vehicle is a determining factor of the vehicle type. It should be appreciated that the present invention can be used with vehicles with any track widths without special adaptations.

Compared to the method described in U.S. Pat. No. 6,498,976 B1 in particular, the inventive method enables a significantly more accurate warning to the driver that is significantly better adapted to the real driving situation. The rollover-critical lateral acceleration value reflects a respectively adapted generation of the warning signal for any type of load and load distribution for any possible vehicle equipment and track width. Warnings to the driver in unnecessary cases are also better avoided in this way.

According to one embodiment of the present invention, the rollover-critical lateral acceleration value is a measure of the lateral acceleration of the vehicle at which the vehicle would actually overturn about its longitudinal axis for a specific type of vehicle construction and vehicle load.

The vehicle can be a towing vehicle or a trailer vehicle, such as, e.g., a semi-trailer or a drawbar trailer. The control device is configured to determine the current lateral acceleration of the vehicle. For this purpose, the control device can, e.g., analyze the signal of a lateral acceleration sensor. Or, based on other input signals, the control device can determine the lateral acceleration by computation, e.g., by analyzing the speeds of rotation of the wheels of the vehicle on the left and right sides of the vehicle. Corresponding speed of rotation differences between the left and the right sides of the vehicle are also a measure of the lateral acceleration of the vehicle taking into account the track width.

The rollover-critical lateral acceleration value can be determined in different ways and stored in the control device. Thus, e.g., the contact force of wheels on the ground can be detected by the control device, e.g., by using a force sensor or by analyzing the bellows pressure of pneumatic suspension bellows if the vehicle is equipped with a pneumatic suspension. Here, when the vehicle is traversing a turn, a determination is made as to how much the wheels of the vehicle on the inside of the turn are relieved of load. The rollover-critical lateral acceleration value can be determined by extrapolating from the determined load reduction value and the lateral acceleration value detected thereby. The rollover-critical lateral acceleration value corresponds to the state of almost completely unloaded wheels on the inside of the turn. In one embodiment of the invention, the speed of rotation of one or more wheels of the vehicle on the inside of the turn can also be analyzed by the control device to determine the rollover-critical lateral acceleration value using the vehicle behavior when travelling around the turn. In order to generate a defined change of the speeds of rotation of the wheels depending on the wheel contact force, e.g., a test braking with low brake pressure can be carried out. This can result in highly unloaded wheels on the inner turn sides of the vehicle reacting more to the brake pressure, such that the speeds of rotation of the wheels reduce characteristically, which can be considered an indicator of a low wheel loading.

The control device can be part of an electronically controlled brake system of the vehicle or a separate control device. The control device can be an electronic control device.

According to another embodiment, the rollover-critical lateral acceleration value is adaptively adjusted by the control device starting from an initial value during one or a plurality of traverses of turns by the vehicle by analyzing at least one other of the input variables detected by the control device. This has the advantage that the control device, by the adaptive adjustment of the rollover-critical lateral acceleration value, can approach the real vehicle-specific and load-specific value of the lateral acceleration at which vehicle overturning is to be feared.

According to a further embodiment, the rollover-critical lateral acceleration value increases during one or a plurality of traverses of turns by the vehicle. A reduction of the rollover-critical lateral acceleration value is therefore not provided. As a result, the rollover-critical lateral acceleration value can only be changed in a direction in which the warning signal is generated sufficiently early before the vehicle actually overturns in any traveling state.

According to another embodiment, during cornering, a test braking on at least one wheel on the inside of the turn is initiated by the control device, whereby the wheel is subjected to a low brake force compared to the maximum possible brake force, and the wheel revolution rate behavior of the wheel is used for the adaptive adjustment of the rollover-critical lateral acceleration value. This has the advantage that, in an electronically controlled brake system, a measure of the traction of the wheel on the inside of the turn can be derived and, at the same time, used as an indicator of the rollover-critical lateral acceleration of the vehicle at which the vehicle would actually overturn about its longitudinal axis. Another advantage is that the inventive method can be combined with a method for avoiding vehicle overturning about its longitudinal axis, such as described in Applicant's DE 100 17 045 A1 (U.S. Pat. No. 6,553,284), by which the speed of the vehicle is reduced in rollover-critical situations by an active brake application that is automatically triggered by the control device.

According to yet another embodiment, the control device can be configured to additionally perform a process for preventing the vehicle from overturning about its longitudinal axis in which, if there is a risk of overturning, braking is automatically initiated by at least one wheel of the vehicle being automatically subjected to a brake force by the control device.

According to a still further embodiment of the present invention, the rollover-critical lateral acceleration value is increased by a step value if it is determined that the test braking does not cause a characteristic reduction of the speed of rotation of at least one wheel braked with the low brake pressure. If the characteristic reduction occurs, e.g., in the form of locking of the wheel (speed of rotation of the wheel=0), no further increase of the rollover-critical lateral acceleration value occurs. In this case, it can be assumed that the previously determined rollover-critical lateral acceleration value is a good approximation of the actual value of the lateral acceleration at which the vehicle would actually overturn about its longitudinal axis. The control device can store the fact that a characteristic reduction of the speed of rotation of the wheel occurred as a result of the test braking and can inhibit further increases of the rollover-critical lateral acceleration value, even if no characteristic reduction of the speed of rotation of the wheel is detected during further test braking with a lateral acceleration in the region of the rollover-critical lateral acceleration value. This can be carried out permanently or temporarily, e.g., until the end of a given trip.

The step value by which the rollover-critical lateral acceleration value is increased in each case can be a specified fixed value or a variable value. It is advantageous to use step values that reduce while travelling, e.g., according to a decaying exponential function or a decaying hyperbolic function. In this way, e.g., starting from an initial value, at each increase in the rollover-critical lateral acceleration value, the step value can be reduced for the next increase of the rollover-critical lateral acceleration value, e.g., by a percentage. This allows a particularly sensitive adaptive adjustment of the lateral acceleration of the vehicle at which the vehicle would actually overturn about its longitudinal axis.

According to another embodiment, the warning signal is output as a visual and/or audible signal. This enables the output of warning messages that are easily and intuitively understandable by the driver. The audible signal can, e.g., be a warning tone or a warning in the form of a speech output. As a visual signal, e.g., a warning light can be switched on or warning messages can be output on a display panel of the vehicle.

According to a further embodiment, the warning signal is generated if the current lateral acceleration exceeds a limit value in relation to the rollover-critical lateral acceleration value. For example, the quotient of the current lateral acceleration and the rollover-critical lateral acceleration value or the difference of the current lateral acceleration and the rollover-critical lateral acceleration value can be used as the current lateral acceleration in relation to the rollover-critical lateral acceleration value and can be compared in terms of magnitude with the limit value.

According to a still further embodiment, the current lateral acceleration of the vehicle is visually displayed in relation to the rollover-critical lateral acceleration value as a warning signal. This enables particularly simple and intuitive detection by the driver of the current risk of the vehicle overturning. The driver can respond thereto intuitively and adjust the speed of the vehicle accordingly.

According to yet another embodiment, the current lateral acceleration of the vehicle is illustrated in relation to the rollover-critical lateral acceleration value in the manner of an artificial horizon. This gives the driver of the vehicle a particularly realistic impression of the lateral tilt of the vehicle and especially of rollover-critical situations. The artificial horizon can be achieved, e.g., using a graphical animation on a graphics-capable display or, if a visual representation is to be generated at low cost, by light bar displays. The tilt angle of the vehicle body relative to the horizontal reproduced using the artificial horizon can be directly determined from the quotient of the current lateral acceleration in relation to the rollover-critical lateral acceleration value or from the difference between the two values. In addition, on reaching or approaching the rollover-critical value, e.g., on exceeding the magnitude of the limit value, an additional visual and/or audible warning is output, e.g., by outputting red warning signals on the display or using warning tones.

According to a still further embodiment, the control device determines a first rollover-critical lateral acceleration value, which is a measure of the lateral acceleration of the vehicle for left turns at which the vehicle would actually overturn about its longitudinal axis in left turns. In addition, the control device determines a second roll-over-critical lateral acceleration value, which is a measure of the lateral acceleration of the vehicle at which the vehicle would actually overturn about its longitudinal axis in right turns. This has the advantage that separate information is available about at which lateral acceleration there is a risk of overturning in a left turn or in a right turn. The warning to the driver or the visual and audible outputs are performed by the control device depending on whether the vehicle is traversing a right turn or a left turn using either the first rollover-critical lateral acceleration value or the second rollover-critical lateral acceleration value. This enables an additional differentiation when generating the warning for asymmetrically constructed vehicles or asymmetric loading of the vehicle. Thus, e.g., a trailer vehicle may only be heavily loaded on one side, so that there can be different rollover-critical lateral acceleration values depending on the turn direction.

The control device includes a data processing device configured to execute a program to implement a method according to an embodiment of the present invention. The control device can, e.g., be an electronic control device including a computer, e.g., as part of an electronically controlled brake system of the vehicle.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is described in greater detail below using exemplary embodiments with reference to the accompanying drawing figures, in which.

In the figures, the same reference characters are used for corresponding elements.

DETAILED DESCRIPTION OF THE PREFERRED EMBODIMENTS

Figure 1:
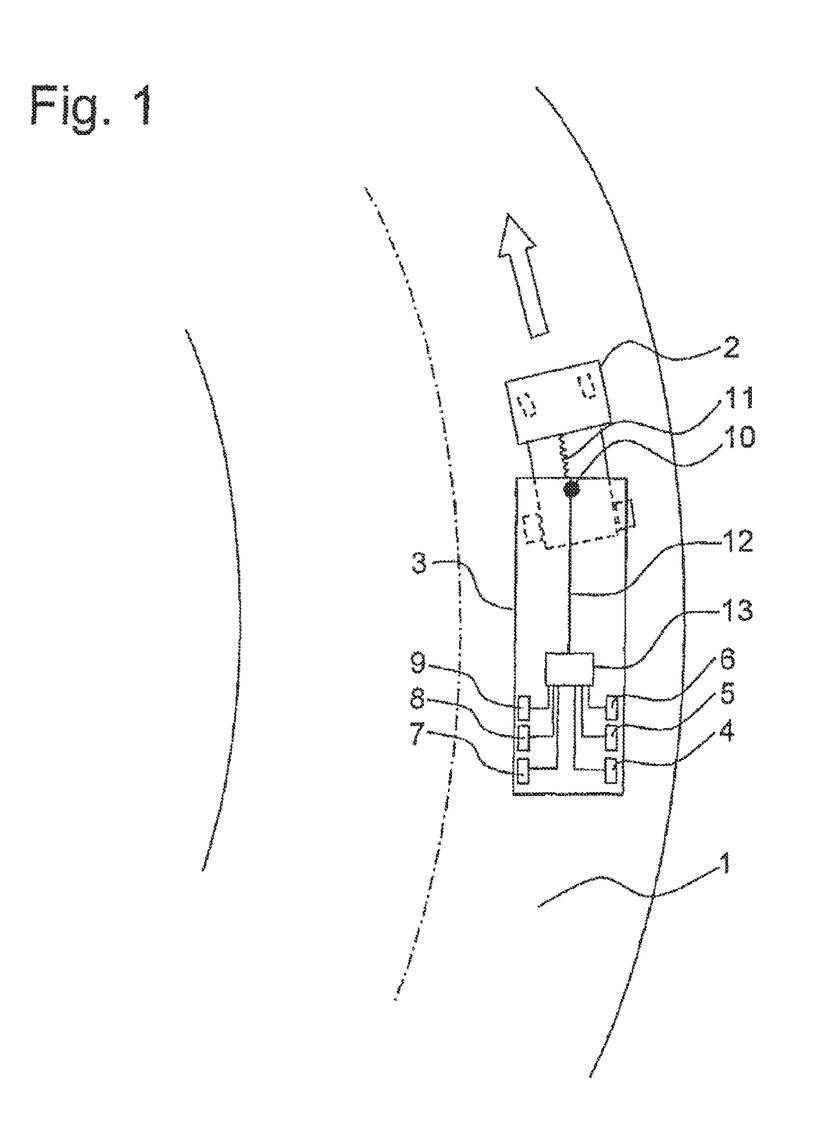
FIG. 1 is a plan view of a vehicle making a left turn in accordance with an embodiment of the present invention.

FIG. 1 is a plan view of a vehicle 2, 3, in this case consisting of tractor unit 2 and a trailer 3, making a left turn on a road 1. The invention is, however, not limited to such type of vehicle. The trailer 3 comprises a brake system of a pneumatic type, which can be subjected to brake pressure from the tractor unit 2 as a result of brake pedal operation by the driver or as a result of certain control and regulation functions in the vehicle. For this purpose, the tractor unit 2 is connected to the trailer 3 by electrical and pneumatic lines 11.

The tractor unit 2 and the trailer 3 are rotatably connected to each other at a point of rotation 10.

The brake system of the trailer 3 comprises, e.g., electrically operated components such as, e.g., ABS brake pressure modulators or even purely electrically operated brake actuators. The brake modulators or brake actuators are controlled by a control device 13 in the form of an electronic controller. The controller 13 and the brake modulators or brake actuators are supplied with electrical energy and the pressure medium or the braking energy via electrical and pneumatic lines 12. The electronic controller 13 is also supplied with speeds of rotation $v_4$, $v_5$, $v_7$, $v_8$ of the wheels 4, 5, 7, 8 in a manner that is known within anti-lock brake systems.

In the present case, the wheels 4, 5, 6 are thus the wheels of the trailer on the outside of the turn, and the wheels 7, 8, 9 are wheels on the inside of the turn.

The electronic controller 13 performs a series of control and regulation tasks in the trailer 3. These tasks include detecting the risk of the vehicle 2, 3 overturning about its longitudinal axis and preventing the same by controlled brake application, as illustrated by way of example in FIG. 2.

Figure 2:
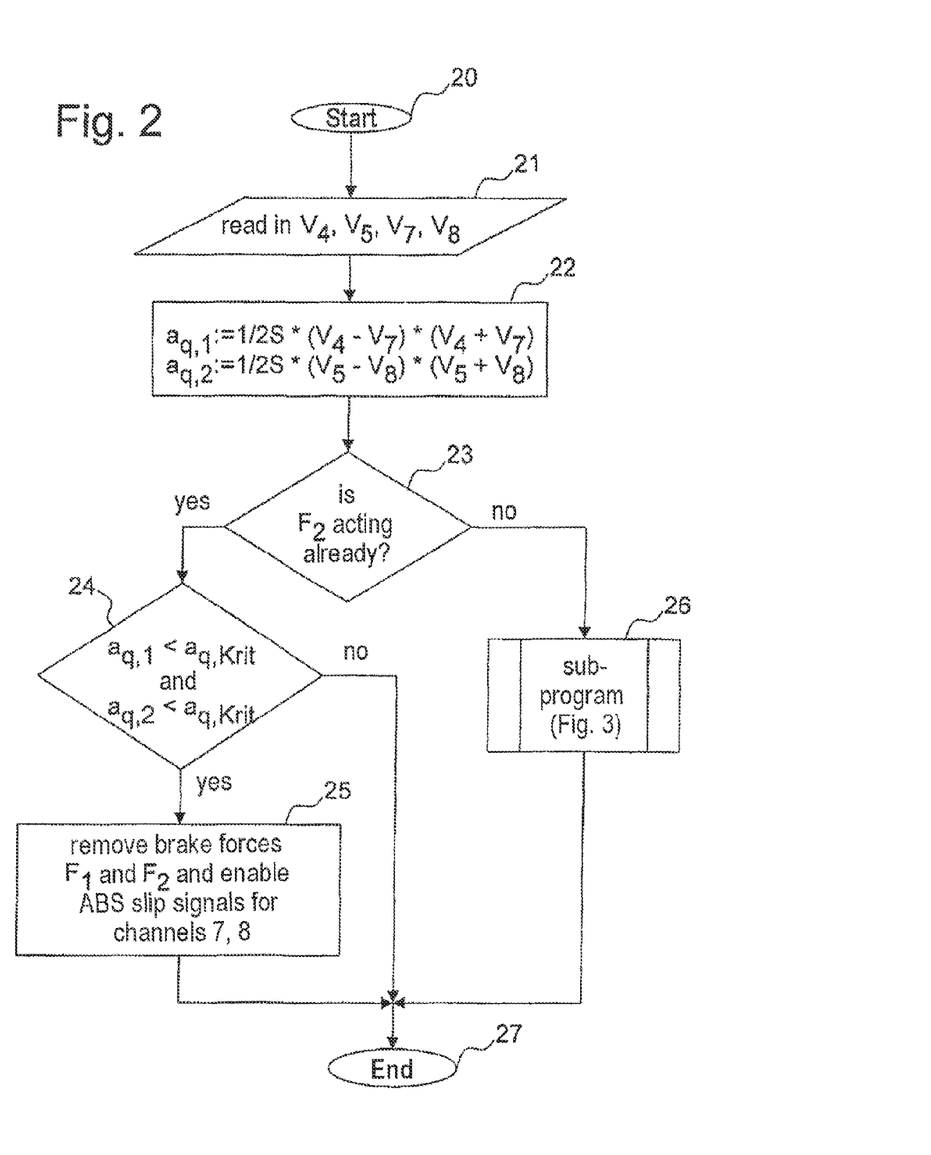
FIGS. 2, 3 and 4 illustrate process steps for warning the driver of a vehicle of a risk of the vehicle overturning about its longitudinal axis according to embodiments of the present invention.

The method illustrated in FIG. 2 starts with a block 20. In a following block 21, the speeds of rotation $v_4$, $v_5$, $v_7$, $v_8$ of the wheels 4, 5, 7, 8 are read in. Then, in an allocation block 22, a first lateral acceleration signal $a_{q,1}$ is determined from the speeds of rotation $v_4$, $v_7$ and a second lateral acceleration signal $a_{q,2}$ is determined from the speeds of rotation $v_5$, $v_8$ according to the following relationships:

$$a_{q,1} = \frac{1}{2 \cdot S} \cdot v_4 - v_7 \cdot v_4 + v_7 \quad [1]$$

$$a_{q,2} = \frac{1}{2 \cdot S} \cdot v_5 - v_8 \cdot v_5 + v_8 \quad [2]$$

The variable S represents the track width of the vehicle. The lateral acceleration signals $a_{q,1}$, $a_{q,2}$ are, respectively, measures of the current lateral accelerations of the vehicle 2, 3. The lateral acceleration signals $a_{q,1}$, $a_{q,2}$ are both used in the following procedure instead of a single lateral acceleration signal, e.g., determined from the speeds of rotation $v_4$, $v_5$, $v_7$, $v_8$. In this way, the method is less susceptible to signal noise, different tire diameters and the like, so that an incorrect response can be avoided.

Figure 3:
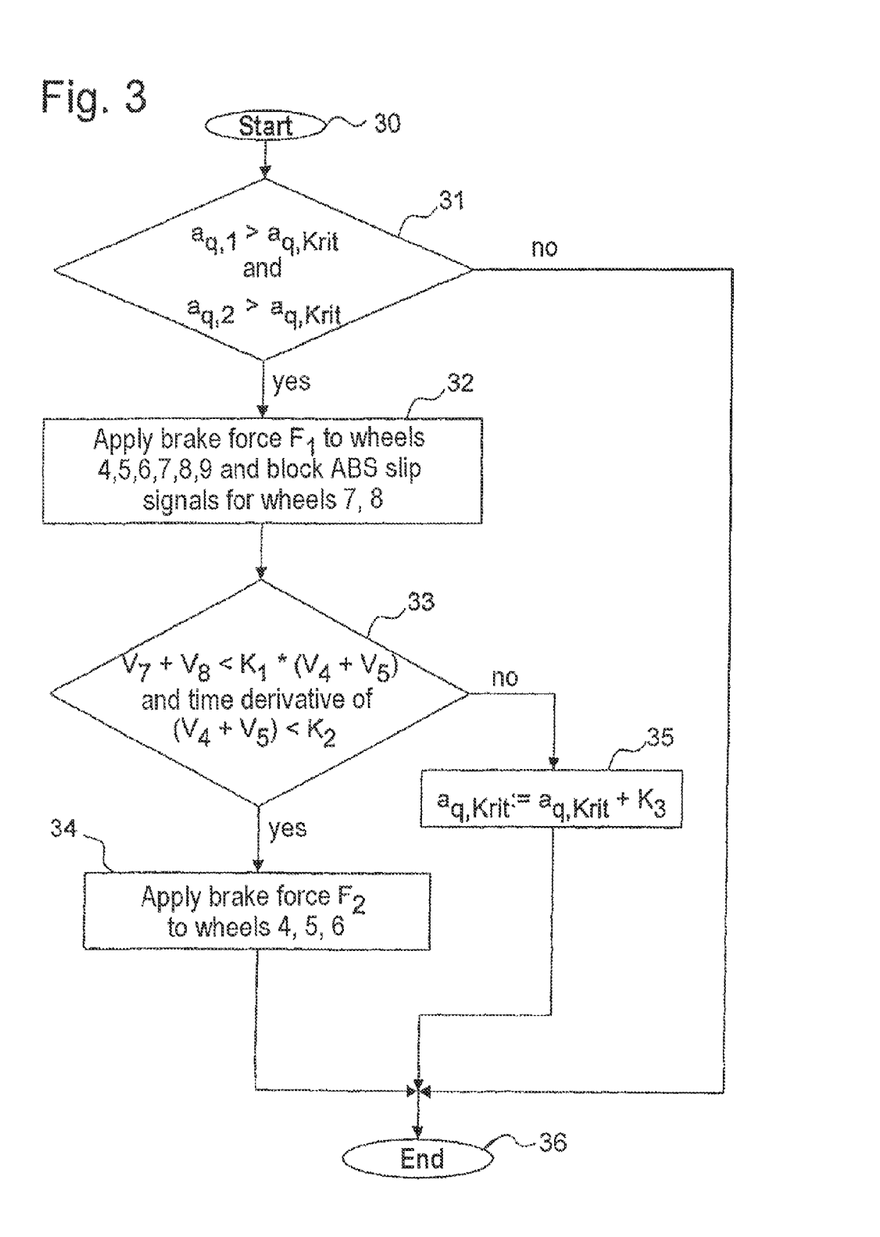
Figure 4:
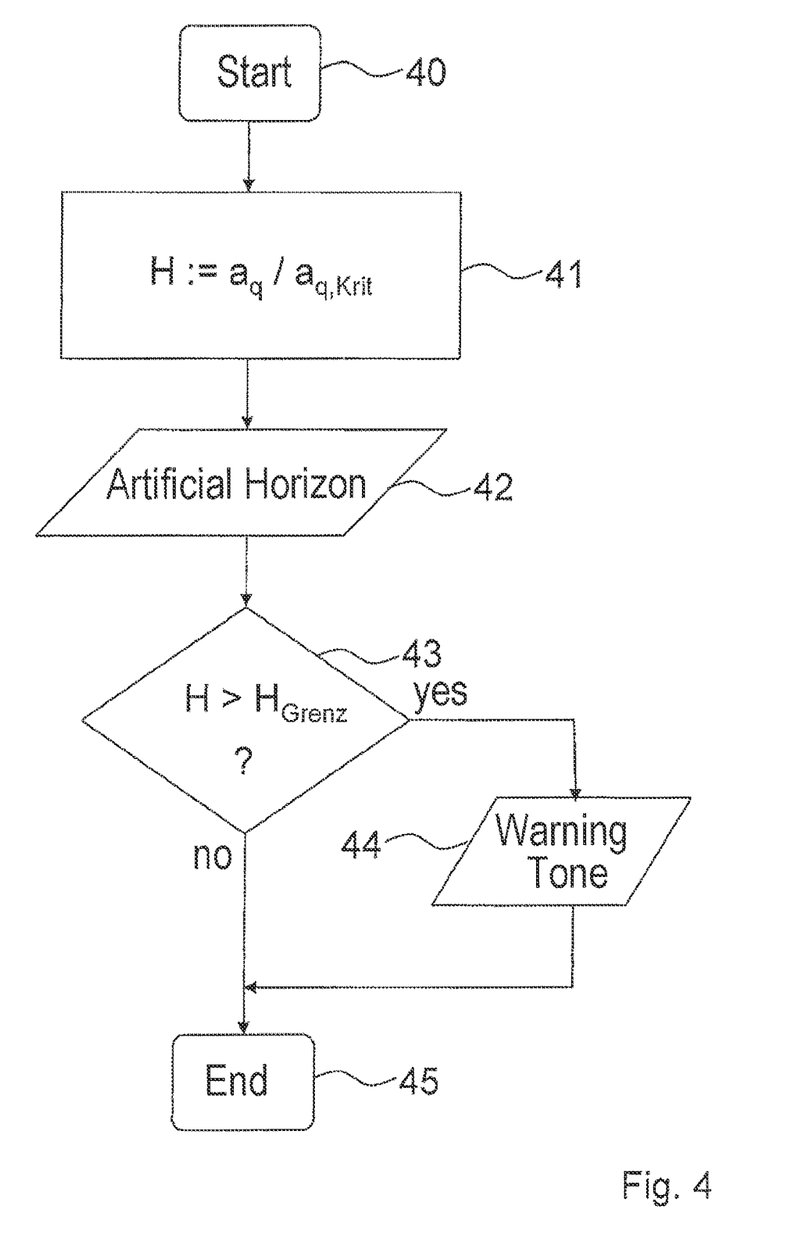

In a decision block 23, a determination is made as to whether the brake system has already been subjected to a brake force $F_2$ for prevention of overturning in an earlier performance of the process illustrated in FIGS. 2, 3 and 4. If this is the case, by by-passing the downstream subprogram block 26 (explained in more detail hereinafter using FIG. 3), which is used, among other things, to detect the risk of overturning, the process branches directly to block 24, in which a determination is made as to whether there is no longer a risk of overturning.

Otherwise, the process continues with the subprogram block 26 illustrated in FIG. 3, which starts with a block 30. In a downstream decision block 31, a determination is made as to whether both the first lateral acceleration signal $a_{q,1}$ and also the second lateral acceleration signal $a_{q,2}$ exceed a lateral acceleration threshold $a_{q,Krit}$ specified for a response of the process. The lateral acceleration threshold $a_{q\ Krit}$ corresponds to the rollover-critical lateral acceleration value. If this is the case, in a block 32, the wheels 4, 5, 6, 7, 8, 9 of the trailer 3 are subjected to a relatively low brake force $F_1$. The brake force $F_1$ is specified such that only a relatively small braking effect occurs that is hardly noticeable by the driver and that does not cause locking of wheels, even on road surfaces with a relatively high coefficient of friction, if there is no risk of overturning. In typical pneumatic brake systems, a brake pressure of approximately 1 to 2 bar is controlled to apply the brake force $F_1$.

Moreover, in block 32, the ABS slip signals for the wheels 7, 8 are blocked in order to prevent execution of the anti-lock function as a result of high slip. Execution as a result of acceleration signals continues to be possible so that possible damage to the tires can be avoided.

In a subsequent decision block 33, following the expiry of an adequate settling time of the brake pressure build-up or of the brake force $F_1$ build-up, a determination is made as to whether the speeds of rotation $v_7$, $v_8$ of the wheels 7, 8 on the inside of the turn are lower in a characteristic manner than the speeds of rotation $v_4$, $v_5$ of the wheels 4, 5 on the outside of the turn, while the speeds of rotation of the wheels on the outside of the turn essentially remain unchanged. The former is checked by comparing the sum of the speeds of rotation $v_7$, $v_5$ of the wheels on the outside of the turn with the sum of the speeds of rotation $v_4$, $v_5$ of the wheels on the inside of the turn amended by a factor $K_1$. The latter is checked using the sum of the decelerations of the wheels 4, 5, i.e., the first time derivative of the associated speeds of rotation $v_4$, $v_5$. The check on the wheels 4, 5 on the outside of the curve for continuing relatively high speeds of rotation is used to prevent incorrect responses of the process at relatively low coefficients of friction, e.g., on ice. Here, not only the speeds of rotation of the wheels on the inside of the turn can reduce as a result of the brake force $F_1$ applied as a test braking, but also the speeds of rotation $v_4$, $v_5$ of the more highly loaded wheels 4, 5 on the outside of the turn. In this case, the speed reduction of the wheels 7, 8 on the inside of the turn is not an indication that the vehicle 2, 3 is about to overturn.

If both of the previously mentioned conditions are fulfilled, an immediate risk of overturning is assumed. Therefore, in a subsequent block 34, the wheels 4, 5, 6 on the outside of the turn having the better adhesion between the road surface and the tires are subjected to a high brake force $F_2$ compared to the brake force $F_1$. The brake force $F_2$ is dimensioned such that the lateral acceleration, and, hence, also the risk of overturning, is immediately reduced by a reduction of the speed of the vehicle. The physical relationship between the lateral acceleration $a_q$ of the vehicle and the speed of the vehicle v is determined by the relationship below, wherein the variable R represents the radius of the turn:

$$a_q = \frac{v^2}{R} \quad [3]$$

Locking of the wheels subjected to the brake force $F_2$ is prevented by the anti-lock brake system. The wheels 7, 8, 9 on the inside of the turn are further subjected to the low brake force $F_1$. A pressure of about 4 to 8 bar is preferably controlled to generate the brake force $F_2$ with a conventional pneumatically controlled brake system.

The subprogram then terminates with a block 36.

If the condition checked in decision block 23 in FIG. 2 is in the affirmative, a determination is made in a subsequent decision block 24 as to whether both the first lateral acceleration signal $a_{q,1}$ and also the second lateral acceleration signal $a_{q,2}$ are below the lateral acceleration threshold $a_{q,Krit}$. If this is the case, there is no longer a risk of overturning and the brake forces $F_1$, $F_2$ can be removed in a subsequent block 25, and the ABS slip signals blocked in block 32 are enabled again. Otherwise, by by-passing the block 25, the process branches directly to a block 27, and the process terminates.

The wheels 7, 8, 9 on the inside of the turn that are subjected to low wheel load when there is a risk of overturning tend towards a reduction in the speed of rotation as a result of the brake force $F_1$ of the test braking. This, in turn, causes a relatively large difference in speed of rotation between the wheels on the inside of the turn and the wheels on the outside of the turn. Using equations [1] and [2], this causes a rapid rise of the first and the second lateral acceleration signals $a_{q,1}$, $a_{q,2}$. Conversely, reinstating contact of the wheels 7, 8, 9 on the inside of the turn, e.g., as a result of braking with the brake force $F_2$ in block 34, causes the calculated lateral acceleration signals $a_{q,1}$, $a_{q,2}$ to reduce rapidly. Because of the rapid change in the lateral acceleration signals, the test braking, which brings the wheels subjected to low wheel load or raised from the ground to rest if there is a risk of overturning, is used for reliable detection of the reinstatement of contact of the wheels or the termination of the risk of overturning, because the wheels on the inside of the turn start turning again as a result of the increasing wheel load despite the braking effect caused by the brake force $F_1$, which causes a characteristic rise in the speeds of rotation $v_7$, $v_8$ of the wheels.

Referring to FIG. 3, if one or both of the conditions checked in the decision block 33 is/are not fulfilled, then, by performing the allocation block 35, in which the lateral acceleration threshold $a_{q,Krit}$ is increased by the value $K_3$, the process branches to block 36, and the process terminates.

If one or both of the conditions checked in the decision block 31 is/are not fulfilled, the process branches to block 36, and the process terminates.

It should be understood that the inventive method is also suitable for vehicles with only one axle or with only one axle fitted with speed of rotation sensors.

FIG. 4 illustrates an embodiment of a method for warning the driver of the vehicle 2, 3 using the current lateral acceleration of the vehicle and the rollover-critical lateral acceleration value. The method starts at block 40. In a subsequent block 41, a risk value H is determined as the quotient of the current lateral acceleration $a_q$ and the rollover-critical lateral acceleration value $a_{q,Krit}$, for which the lateral acceleration threshold determined in block 35 according to FIG. 3 can be used. As the current lateral acceleration $a_q$, e.g., the average value of $a_{q,1}$ and $a_{q,2}$ can be used. In a subsequent block 42, a visual output of the risk value H is carried out as an artificial horizon, as explained below. The risk value H can, e.g., thereby be converted directly proportionally into an inclination of the artificial horizon relative to the horizontal.

In a subsequent decision block 43, a determination is made as to whether the risk value H exceeds a risk limit value $H_{Grenz}$. If this is the case, the process branches to an output block 44, in which the output of a warning tone is initiated. The process then terminates at block 45.

The output of the warning can, e.g., then take place if the magnitude of the current lateral acceleration of the vehicle reaches or exceeds 95% of the rollover-critical lateral acceleration value.

The driver is hereby not unnecessarily warned of an impending risk of the vehicle overturning. Especially for unladen vehicles, there is no risk of overturning, so, unnecessary warnings are avoided.

Figure 5:
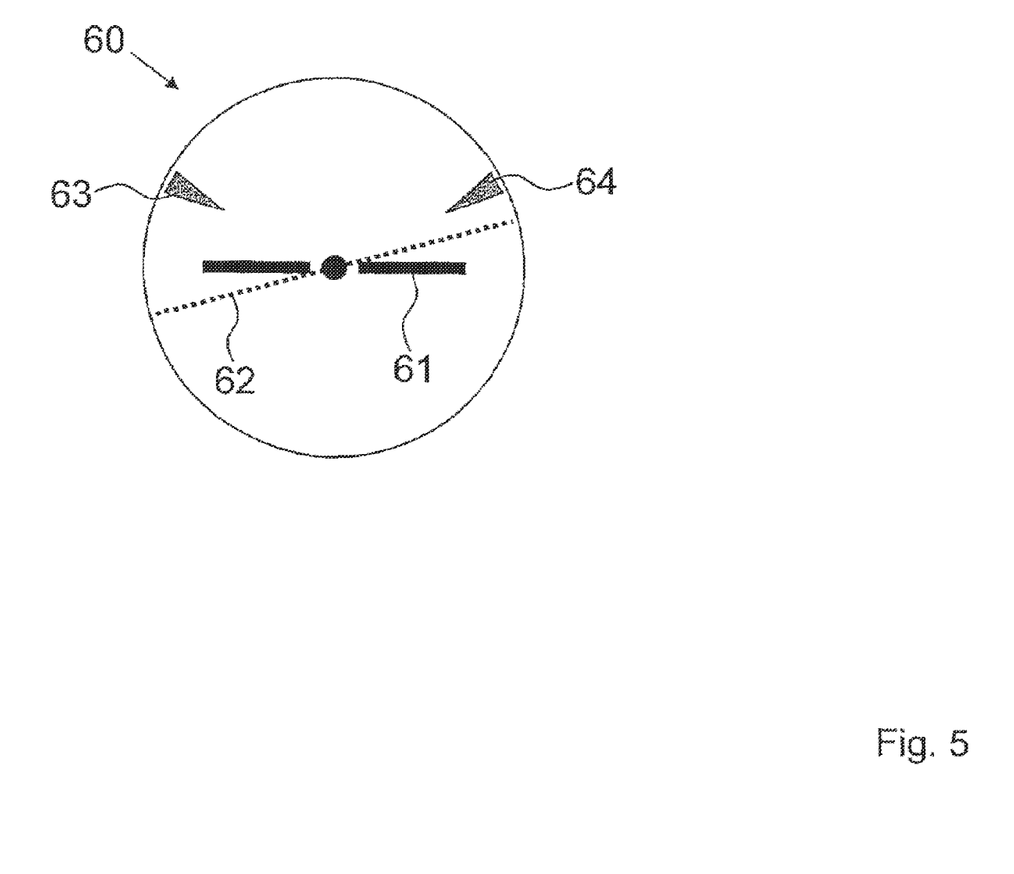
FIG. 5 is a visual representation of lateral acceleration values according to one embodiment of the present invention.

FIG. 5 schematically depicts a visual representation of the current lateral acceleration of the vehicle in relation to the rollover-critical lateral acceleration value as an artificial horizon according to one embodiment of the present invention. An animation of an artificial horizon with a display area 60 can be illustrated, e.g., on a graphics-capable display of the vehicle. Within the display area 60, a horizontal bar arrangement 61 represents the horizontal. A line 62 that can vary in respect of its inclination indicates an artificial horizon, as it would correspond to the perception of the driver of the vehicle in the event of a corresponding tilting of the vehicle. FIG. 5 is an exemplary representation during a left turn. The angle between the line 62 and the bar arrangement 61 is a measure of the current lateral acceleration of the vehicle, wherein, optionally, the current lateral acceleration can be used directly for this or in relation to a roll-over-critical lateral acceleration value. Warning markers 63, 64 indicate the position of the rollover-critical value for the lateral acceleration. If the line 62 reaches one of the warning markers 63, 64, then the vehicle is in a hazardous state in which there is a risk of overturning about the longitudinal axis.

The warning markers 63, 64 can be merged into a visual output of the artificial horizon 60 by the control device at a desired position that corresponds to the rollover-critical lateral acceleration value, i.e., it is calculated numerically from this. The line 62 is shown directly according to the current lateral acceleration, wherein, based on the visual output, the relationship to the rollover-critical lateral acceleration value is given using the warning markers 63, 64. In this case, the generation of the quotient or of the difference of the current lateral acceleration and the rollover-critical lateral acceleration value is not necessary. The warning markers 63, 64 can also be merged at fixed positions. In this case, it is advantageous to determine the line 62 in relation to its inclined position using a calculated relationship between the current lateral acceleration and the rollover-critical lateral acceleration value, e.g., by means of the quotient generation or the difference generation.

Figure 6:
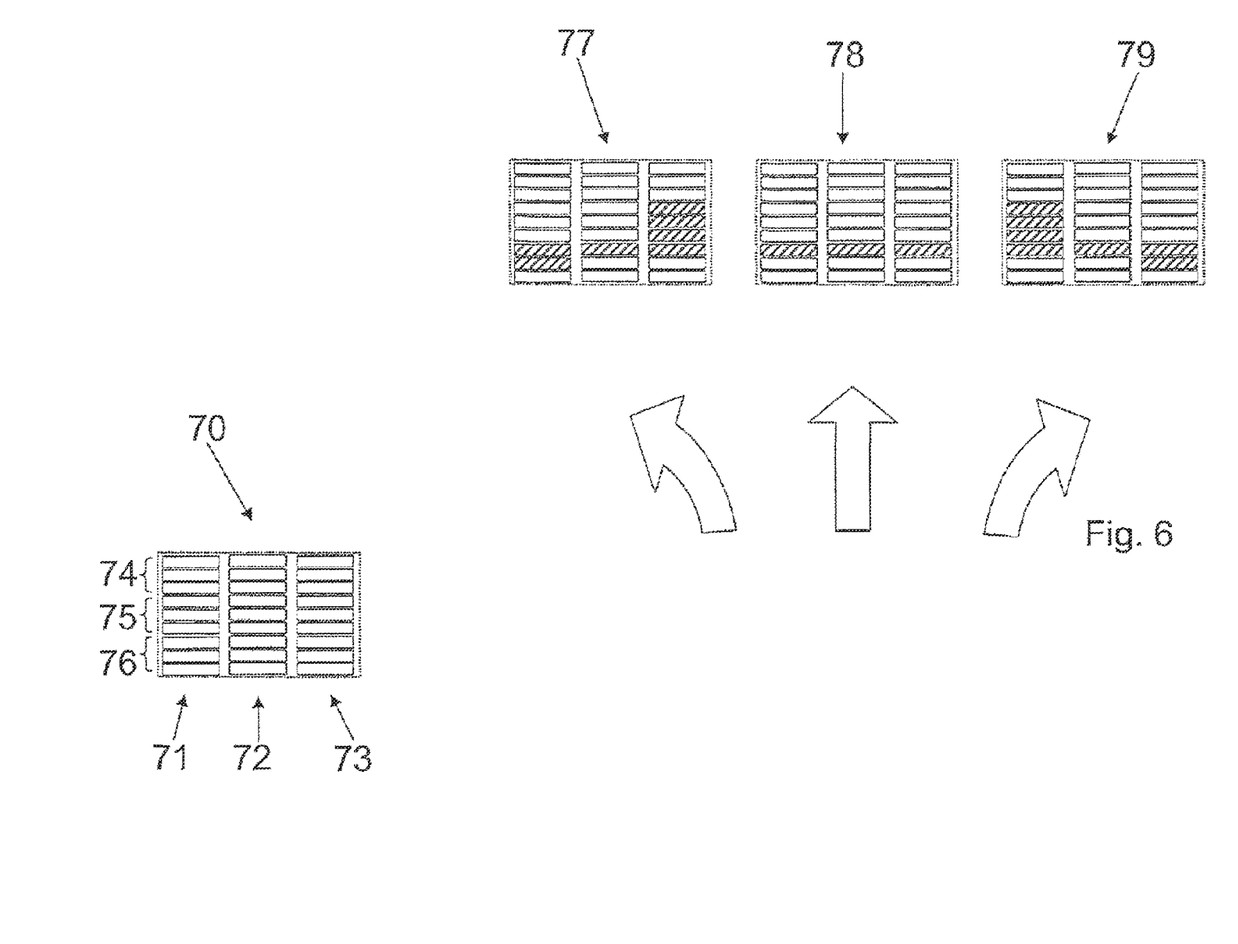
FIG. 6 is a visual representation of lateral acceleration values according to another embodiment of the present invention.

FIG. 6 shows another embodiment of the visual representation of the current lateral acceleration in relation to the rollover-critical lateral acceleration value in the form of an artificial horizon. At the bottom left of FIG. 6, an output display is shown in a block 70, which consists of three bar displays 71, 72, 73 disposed adjacent to each other, e.g., formed by light emitting diodes. Each of the bar displays 71, 72, 73 can be formed by blocks of differently colored light emitting diodes, e.g., in the lower area with a block 76 of green light emitting diodes, in the center with a block 75 of yellow light emitting diodes, and in the upper area with a block 74 of red light emitting diodes. The safety or the risk of the vehicle state can be signaled by the colors, where, for example, green stands for a low risk and red for a high risk.

In the right area of FIG. 6, the type of the display is illustrated by way of example using a left turn of the vehicle (block 77), straight-ahead travel (block 78), and a right turn (block 79). Illuminating light emitting diodes are thereby characterized by hatching. The arrows shown beneath the blocks are only used for the illustration and are not part of the visual representation of the output display. For the left turn, it can be seen from the left bar display 71 that two of the green light emitting diodes are illuminating, from the central bar display 72, the topmost green light emitting diode is illuminating, and from the right bar display 73, the topmost green light emitting diode is illuminating, as well as all yellow light emitting diodes. This signals traversing of a left turn with a risk of overturning that is already somewhat increased but not yet critical. For straight-ahead travel, block 78, in which the topmost green light emitting diode of each bar display 71, 72, 73 is illuminating, illustrates a safe driving state without significant lateral acceleration. The illustration for a right turn in block 79 corresponds analogously to the illustration for the left turn, but with a correspondingly reversed sequence of the representation of the bar displays 71, 72, 73.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A method for warning the driver of a vehicle of a risk of the vehicle overturning about its longitudinal axis, the method comprising:
using a control device, detecting a current lateral acceleration of the vehicle,
determining a rollover-critical lateral acceleration value for the vehicle based on the lateral acceleration of the vehicle at which the vehicle would overturn about its longitudinal axis,
subjecting a wheel of the vehicle on the inside of a turn to a low brake force relative to a maximum possible brake force,
adaptively adjusting the rollover-critical lateral acceleration value based on wheel revolution rate behavior of the wheel subjected to the low brake force,
based on a subsequent lateral acceleration of the vehicle relative to the adjusted rollover-critical lateral acceleration value, outputting a warning signal when a risk of the vehicle overturning is presented, wherein the warning signal is prompted in response to the subsequent lateral acceleration of the vehicle relative to the adjusted rollover-critical lateral acceleration value exceeding a predetermined risk limit value, such the warning signal corresponds to the subsequent lateral acceleration being at least a predetermined percentage, less than one hundred percent, of the adjusted rollover-critical lateral acceleration value, and
displaying the adjusted rollover-critical lateral acceleration value as a stationary warning marker and displaying the subsequent lateral acceleration of the vehicle as an artificial horizon that is rotatable relative to the stationary warning marker, wherein the warning signal causes a further visual warning or audible warning for the driver.

2. The method as claimed in claim 1, further comprising adaptively adjusting the rollover-critical lateral acceleration value using the control device starting from an initial value during at least one traversal of a turn by the vehicle by analyzing at least one other input variable detected by the control device.

3. The method as claimed in claim 2, further comprising increasing the rollover-critical lateral acceleration value during the at least one traversal of a turn by the vehicle.

4. The method as claimed in claim 1, wherein adaptively adjusting the rollover-critical lateral acceleration value includes increasing the rollover-critical lateral acceleration value by a step value when test braking does not cause a characteristic reduction in speed of rotation of the wheel subjected to test braking.

5. A control device configured to effect the method as claimed in claim 1.

6. The method as claimed in claim 1, wherein the rollover-critical lateral acceleration value is determined based on an extent of load relief on at least one wheel of the vehicle on the inside of the turn.

7. The method as claimed in claim 1, further comprising using the control device to determine a first rollover-critical lateral acceleration value that measures the lateral acceleration of the vehicle at which the vehicle would overturn about its longitudinal axis in left turns, and a second rollover-critical lateral acceleration value that measures the lateral acceleration of the vehicle at which the vehicle would overturn about its longitudinal axis in right turns.

* * * * *